(12) United States Patent
Uchikawa et al.

(10) Patent No.: US 7,471,446 B2
(45) Date of Patent: Dec. 30, 2008

(54) SCAN-TYPE OPTICAL APPARATUS

(75) Inventors: Daisuke Uchikawa, Matsumoto (JP);
Shigeo Nojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 27 days.

(21) Appl. No.: 11/774,957

(22) Filed: Jul. 9, 2007

(65) Prior Publication Data

US 2008/0043319 A1    Feb. 21, 2008

(30) Foreign Application Priority Data

Aug. 21, 2006    (JP) ............... 2006-224108

(51) Int. Cl.
*G02F 1/29* (2006.01)
*G02F 1/00* (2006.01)

(52) U.S. Cl. .................. 359/315; 359/321; 359/322
(58) Field of Classification Search ............ 359/315, 359/321, 322
See application file for complete search history.

(56) References Cited

U.S. PATENT DOCUMENTS

| 2008/0117499 A1* | 5/2008 | Nojima ............ 359/315 |
| 2008/0204851 A1* | 8/2008 | Uchikawa et al. ...... 359/276 |
| 2008/0204858 A1* | 8/2008 | Won et al. ............ 359/320 |

FOREIGN PATENT DOCUMENTS

| JP | A-60-242433 | 12/1985 |
| JP | A-60-242434 | 12/1985 |
| JP | A-08-184860 | 7/1996 |
| JP | A-2001-287403 | 10/2001 |
| JP | A 2004-312347 | 11/2004 |
| JP | A-2004-333698 | 11/2004 |
| JP | A-2005-241482 | 9/2005 |
| JP | A-2006-085189 | 3/2006 |

OTHER PUBLICATIONS

"Discovery of a Novel Beam Scanning Phenomenon," *Nippon Telegraph and Telephone Corporation*; May 18, 2006 (with Translation).
"Novel Beam Scanning Phenomenon Using KTN Crystal;" *NTT Technical Review*; vol. 4; No. 7; Jul. 2006.

* cited by examiner

*Primary Examiner*—David N Spector
(74) *Attorney, Agent, or Firm*—Oliff & Berridge, PLC

(57) ABSTRACT

A scan-type optical apparatus includes a light source device that emits a laser beam, an electro-optic element that conducts scan of the laser beam emitted from the light source device by varying refractive index distribution in accordance with the level of voltage to be applied, and a light blocking member disposed on an optical path of the laser beam emitted from the electro-optic element when no voltage is applied to the electro-optic element.

9 Claims, 3 Drawing Sheets

SCAN-TYPE OPTICAL APPARATUS

BACKGROUND

1. Technical Field

The present invention relates to a scan-type optical apparatus.

2. Related Art

Recently, there is an increasing demand for a projector which is small-sized and produces high-quality images. In addition, with the developments of high output semiconductor laser and blue and green lasers, projector and display containing laser beam source for emitting laser beams are being developed increasingly. These devices can greatly widen the color reproduction range since they have a narrow wavelength range of the light source. Moreover, the projector and display including the laser beam source can reduce the size of the entire apparatus and the number of the components, and therefore have great potentialities as display apparatus for the next generation. Furthermore, the laser beam source has higher light emitting efficiency than that of a discharge lamp such as a known extra-high pressure mercury lamp, and thus contributes to power-saving of the apparatuses.

A certain type of display apparatus using a laser beam source device modulates the intensity of respective laser beams by two-dimensional laser beam scan to produce a picture image. For example, this display apparatus synthesizes R, G and B lights emitted from different laser beam source devices for generating the corresponding color lights into one light, and conducts scan of the resultant light using an optical scan device to display a picture image on a screen or the like.

For displaying a visually and completely recognizable image by using the laser beam source, it is necessary to increase the intensity of the laser beams emitted from the laser beam source to a certain level or greater. Thus, when a scan optical system of the image display apparatus stops for some reason, the laser beams continue to illuminate one point and therefore possibly damages the illuminated surface. Thus, a projector which prevents emission of laser beams from a housing of the apparatus when a scan unit stops for some failure has been proposed (for example, see JP-A-2004-312347 (Patent Document 1)).

The projector disclosed in this JP-A-2004-312347 includes a laser beam source, a scan unit, and a hold unit for stopping the scan unit at a predetermined position and holding the unit at that position. The hold unit of the projector constantly applies load to the scan unit. The load is given to the scan unit such that the laser beams can be compulsorily directed toward the outside of the housing opening when the scan unit stops for some reason. By this method, the hold unit prevents emission of the laser beams out of the housing of the projector when the scan operation of the scan unit is under an abnormal condition.

The scan unit has an MEMS scanner capable of providing sufficient scan speed. The MEMS scanner is driven by a device utilizing electrostatic force or a piezoelectric device.

However, the following problems arise from the above related art. According to the display apparatus disclosed in JP-A-2004-312347, an external force is given to the scan unit to divert the optical axis and thus prevent emission of the laser beams out of the housing when the scan unit stops for some failure. However, this method requires complicated structure and thus is difficult to be put to practical use.

In addition, when the MEMS mirror which generally performs reciprocating rotation is used in the scan unit, the neutral, position of the MEMS mirror having no breakage of its torsion bar is positioned at the center of the scan range. When a light blocking plate is equipped at the neutral position, for example, the center of the scan range is unusable and the display performance thus lowers. Moreover, it is generally hard to achieve compatibility between a deflection angle and a scanning speed in the MEMS scanner, and thus is difficult to obtain a sufficient deflection angle for achieving a necessary scanning speed.

SUMMARY

It is an advantage of some aspects of the invention to provide a scan-type optical apparatus which obtains a sufficient deflection angle, conducts scan of an emitted laser beam without affecting the beam, and prevents continuous irradiation of the laser beam at a point outside the apparatus when a scan unit stops for some reason.

In order to provide this advantage, a scan-type optical apparatus according to an aspect of the invention has the following structure.

A scan-type optical apparatus according to an aspect of the invention includes a light source device that emits a laser beam, an electro-optic element that conducts scan of the laser beam emitted from the light source device by varying refractive index distribution in accordance with the level of voltage to be applied, and a light blocking member disposed on an optical path of the laser beam emitted from the electro-optic element when no voltage is applied to the electro-optic element.

In the scan-type optical apparatus according to this aspect of the invention, it is preferable that the light blocking member is disposed on or in the vicinity of a border of a scan range of the laser beam emitted from the electro-optic element when voltage is applied to the electro-optic element to generate an electric field in the electro-optic element.

According to the scan-type optical apparatus of this aspect of the invention, the refractive index distribution of the electro-optic element successively increases or decreases in the direction of electric field by applying voltage to the electro-optic element. Thus, the beam advancing in the direction perpendicular to the electric field generated in the electro-optic element is bent from the low refractive index side to the high refractive index side.

In addition, since the light blocking member is disposed on or in the vicinity of the border of the scan range of the laser beam, the effect of the light blocking member exerted on the laser beam emitted from the device can be reduced to the minimum while the electro-optic element is conducting the beam scan in the normal condition. Accordingly, the scan range is not influenced by the presence of the light blocking member, and therefore the laser beam scan can be appropriately carried out.

When the electro-optic element fails for some reason, the electro-optic element does not receive voltage and thus stops laser beam scan. In this case, since the light blocking member is disposed on the optical path of the beam emitted from the electro-optic element when no voltage is applied thereto, the laser beam emitted from the electro-optic element is blocked by the light blocking member. Thus, the laser beam does not continuously irradiate a certain area (one point) outside the apparatus.

In this aspect of the invention, it is assumed that no voltage is applied under the condition of failure.

In the scan-type optical apparatus according to this aspect of the invention, it is preferable that the light blocking member is disposed at a position out of the scan range of the laser beam.

In the scan-type optical apparatus according to this aspect of the invention, it is further preferable that the light blocking member is disposed out of a range of the laser beam scan contributing to image display.

According to the scan-type optical apparatus of this aspect of the invention, the light blocking member has such a size which does not narrow the scan range of the laser beam emitted from the electro-optic element. Thus, the light blocking member does not block the laser beam while the electro-optic element is conducting beam scan in the normal condition. Since the scan range of the laser beam is not influenced by the presence of the light blocking member, reduction of the scan range of the laser beam or other problems is not caused.

In the scan-type optical apparatus according to this aspect of the invention, it is preferable that a cooling unit that cools the light blocking member is included.

According to the scan-type optical apparatus of this aspect of the invention, heat of the laser beam applied onto the heat blocking member is released by cooling the heat blocking member using the cooling unit. Thus, heating of the light blocking member is avoided.

In the scan-type optical apparatus according to this aspect of the invention, it is preferable that the light blocking member has a reflection area that reflects the laser beam emitted from the electro-optic element toward an entrance end surface of the electro-optic element, and that a light absorbing unit that absorbs the laser beam reflected by the reflection area is provided on the entrance end surface side of the electro-optic element.

According to the scan-type optical apparatus of this aspect of the invention, the laser beam scan stops when the electro-optic element fails for some reason. In this case, the laser beam emitted from the electro-optic element is reflected by the reflection area provided on the heat blocking member toward the entrance end surface of the electro-optic element. Then, the heat of the laser beam reflected by the reflection area is absorbed by the light absorbing unit equipped on the entrance end surface side of the electro-optic element.

The scan-type optical apparatus according to this aspect of the invention is particularly effective when the output of the laser beam is so intensive that the heat of the laser beam applied to the light blocking member needs to be released. Since the laser beam scan is conducted on the exit end surface side of the electro-optic element, it is difficult to securely produce a wide space sufficient for cooling the light blocking member in that area. Thus, the light absorbing unit is disposed on the entrance end surface side of the electro-optic element where a wide space can be securely obtained. In this case, by increasing the size of the light absorbing unit to a relatively large size, the heat of the laser beam can be efficiently released.

In the scan-type optical apparatus according to this aspect of the invention, it is preferable that a cooling unit that cools the light absorbing unit is included.

According to the scan-type optical apparatus of this aspect of the invention, the heat of the laser beam absorbed by the light absorbing unit is released using the cooling unit. In this case, since there is a sufficient space on the entrance end surface side of the electro-optic element, the cooling unit for cooling the light absorbing unit can be easily disposed. Thus, the size reduction of the apparatus can be achieved by effectively utilizing this space.

In the scan-type optical apparatus according to this aspect of the invention, it is preferable that the light blocking member has a light detecting unit that detects a laser beam, and that a control unit that controls operation of the light source device in accordance with detection of the laser beam by the light detecting unit is included.

According to the scan-type optical apparatus of this aspect of the invention, the laser beam scan stops when the electro-optic element fails for some reason. In this case, the laser beam emitted from the electro-optic element is detected by the light detecting unit provided on the light blocking member. When the intensity of the laser beam detected by the light detecting unit is larger than a predetermined value, the control unit stops the actuation of the light source device. Since the operation of the light source device stops by the stop of the laser beam scan, the possibilities of breakage of the light blocking member, and the wasted power consumption of the laser beam source can be reduced.

In the scan-type optical apparatus according to this aspect of the invention, it is preferable that the electro-optic element has a composition of $Kta_{1-x}Nb_xO_3$.

According to the scan-type optical apparatus of this aspect of the invention, the electro-optic element is a crystal as a dielectric material having high dielectric constant and a composition of $Kta_{1-x}Nb_xO_3$ (potassium tantalate niobate; hereinafter referred to as KTN crystal). The KTN crystal has characteristics of varying the crystal system from cubic system to square system and further to rhombohedron system according to the temperature, and has large secondary electro-optic effect in cubic system. Particularly in a range near the phase transition temperature from cubic system to square system, a phenomenon of dielectric constant divergence is caused, and thus the secondary electro-optic effect proportional to the square of the dielectric constant becomes an extremely large value. Therefore, the crystal having the composition of $Kta_{1-x}Nb_xO_3$ requires lower voltage which is necessary for varying the refractive index than that in case of other crystals, and thus power-saving of the electro-optic element can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of a scan-type optical apparatus according to the invention will be hereinafter described with reference to the drawings. In the appended drawings, the scales of respective components are appropriately varied so that the components can be those of recognizable sizes.

First Embodiment

A scan-type optical apparatus 1 includes a light source device 11 for emitting laser beams, an electro-optic element 12 for conducting scan of the laser beams emitted from the light source device 11, a light blocking plate (light blocking member) 13 disposed on the light exit side of the electro-optical element 12.

Figure 1A:
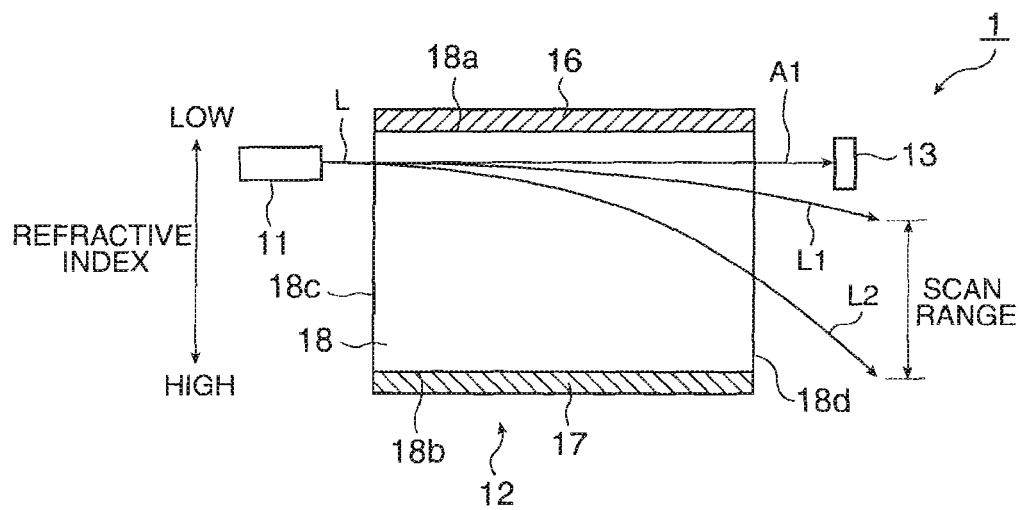
FIGS. 1A and 1B are plan view and perspective view of a scan-type optical apparatus in a first embodiment according to the invention, respectively.

As illustrated in FIG. 1A, the electro-optic element 12 has a first electrode 16, a second electrode 17, and an optical element 18.

Figure 1B:
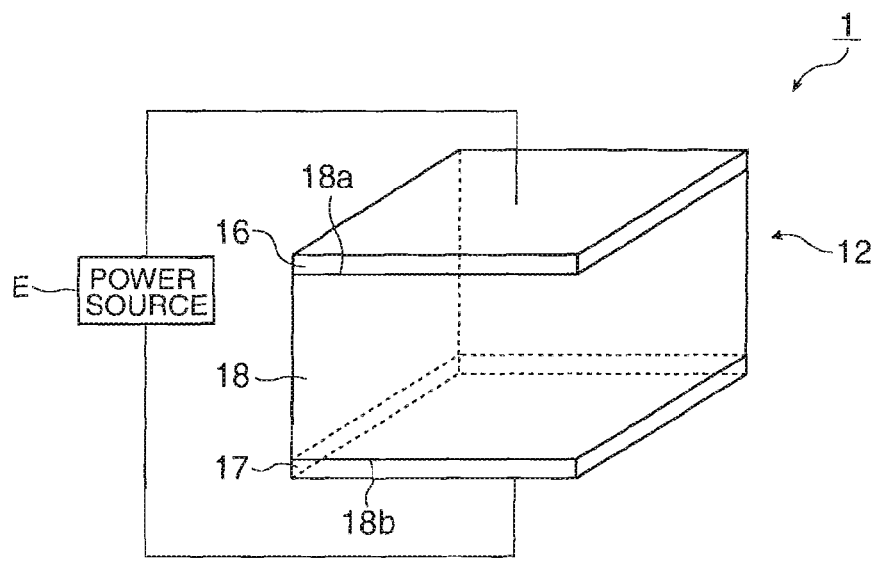

The optical element 18 is a dielectric crystal (electro-optic crystal) having electro-optic effect, and is constituted by a crystal material having a composition of KTN (potassium tantalate niobate; $Kta_{1-x}Nb_xO_3$) in this embodiment. As illustrated in FIG. 1B, the optical element 18 has a rectangular parallelepiped shape. The first electrode 16 is disposed on an upper surface 18a of the optical element 18, and the second electrode 17 is disposed on a lower surface 18b of the optical element 18. A power source E for applying voltage is connected with the first and second electrodes 16 and 17. As illustrated in FIG. 1A, the dimension of the first electrode 16 is substantially equivalent to that of the second electrode 17 in the advancing direction of a laser beam L advancing within the optical element 18. This structure allows an electric field to be generated in the optical element 18 between the first electrode 16 and the second electrode 17.

When the electro-optic element 12 fails for some reason, voltage is not applied to the first and second electrodes 16 and 17. That is, when no voltage is applied to the first and second electrodes 16 and 17, the laser beam advancing in the electro-optic element 12 travels straight, and is emitted from an exit end surface 18d of the optical element 18. An optical path of the laser beam emitted from the light source device 11 when no voltage is applied is referred to as an optical path A1.

The light blocking plate 13 is formed by a material having light blocking capability. The light blocking plate 13 is made of a flame retardant material colored by dye or pigment with reduced light reflectivity, for example. It is preferable that the light blocking plate 13 is constituted by a material having high thermal conductivity or having light absorptivity since the light blocking plate 13 receives irradiation of the laser beam. As illustrated in FIG. 1A, the light blocking plate 13 is disposed on the optical path A1 on the exit end surface 18d of the optical element 18 and outside the scan range of the laser beam emitted from the light source device 11. The size of the light blocking plate 13 is determined such that the light blocking plate 13 does not narrow the scan range of the laser beam emitted from the exit end surface 18d of the optical element 18 when an initial voltage S1 applied to the optical element 18. In addition, the size of the light blocking plate 13 is larger than the diameter of the laser spot. Thus, the light blocking plate 13 is disposed in such a position as not to receive a laser beam L1 during ordinary scanning.

As illustrated in FIG. 1A, the light source device 11 is located such that the laser beam can enter the optical element 18 from the first electrode 16 side.

According to this embodiment, the scan range can be widened by supplying the laser beam from the first electrode 16 side of the optical element 18, since the laser beam having entered the optical element 18 is bent toward the second electrode 17 side due to the refractive index distribution of the electro-optical element 12.

The operation of the electro-optic element 12 is now discussed.

The power source E applies +250V voltage to the first electrode 16, and 0V to the second electrode 17, for example. After voltages are applied to the first and second electrodes 16 and 17, an electric field is generated in the optical element 18 from the first electrode 16 to the second electrode 17. As illustrated in FIG. 1A, the refractive index of the optical element 18 is smaller on the first electrode 16 side and larger on the second electrode 17 side. Thus, the laser beam advancing in the direction perpendicular to the electric field generated in the optical element 18 is deflected. More specifically, the laser beam L having entered from an entrance end surface 18c of the optical element 18 on the first electrode 16 side having smaller refractive index is bent toward the second electrode 17 side of the optical element 18 having larger refractive index, and is emitted through the exit end surface 18d.

Figure 2:
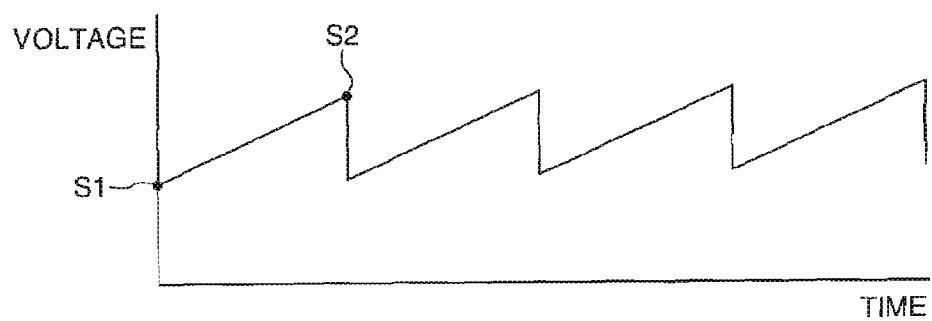
FIG. 2 illustrates a waveform of voltage applied to an electrode of an electro-optic element shown in FIGS. 1A and 1B.

The waveform of the voltage applied to the first electrode 16 is a serrate waveform as illustrated in FIG. 2. When the initial voltage S1 is applied to the first electrode 16, the laser beam L1 emitted from the light source device 11 and advancing in the optical element 18 is sent toward the second electrode 17 side due to the refractive index distribution of the optical element 18 as illustrated in FIG. 1A. Then, the laser beam L1 is emitted from the exit end surface 18d of the optical element 18 without collision with the light blocking plate 13. When the voltage applied to the first electrode 16 is gradually raised as indicated by the voltage waveform shown in FIG. 2 up to the maximum voltage S2, a laser beam L2 emitted from the light source device 11 and advancing in the optical element 18 is deflected in the optical element 18 more greatly than the laser beam L1 as illustrated in FIG. 1A. Then, the laser beam L2 is emitted from the exit end surface 18d of the optical element 18 at a larger deflection angle than that of the laser beam L1.

Thus, by applying the voltage having the waveform shown in FIG. 2 to the first electrode 16, the electro-optic element 12 conducts scan of the laser beam L emitted from the light source device 11 in the scan range from the laser beam L1 to the laser beam L2. More specifically, by varying the voltage applied to the first electrode 16, the beam entering through the entrance end surface 18c of the optical element 18 and leaving through the exit end surface 18d scans in the one-dimensional direction.

According to the scan-type optical apparatus 1 in this embodiment, the laser beam scan by the electro-optic element 12 stops when the electro-optic element 12 fails for some reason. In this case, the laser beam emitted from the electro-optic element 12 is blocked by the light blocking plate 13 since the light blocking plate 13 is disposed on the optical path A1. Thus, the laser beam does not continuously illuminate a certain area (one point) outside the apparatus.

Moreover, the light blocking plate 13 having such a size that does not reduce the scan range of the laser beam emitted from the electro-optic element 12 does not block the laser beam while the electro-optic element 12 is performing beam scan in the normal condition. Thus, the light blocking plate 13 does not narrow the scan range, and the laser beam appropriately performs scanning.

Since the optical element 18 is constituted by the KTN crystal, the deflection angle (scan angle) of the beam emitted from the exit end surface 18d of the optical element 18 can be increased. In addition, since the KTN scanner can scan at an equivalent speed as the speed of the MEMS scanner (about microseconds) display having high resolution can be achieved.

Thus, the scan-type optical apparatus 1 in this embodiment can obtain the sufficient deflection angle, conduct scan of the emitted laser beam without affecting the laser beam, and prevent continuous irradiation of the laser beam at one point outside the apparatus when the laser beam scan stops for some reason.

It is possible to provide a fin for releasing heat of the laser beam absorbed by the light blocking plate 13, or a cooling unit for cooling the light blocking plate 13 on the scan-type optical apparatus 1 in this embodiment. The cooling unit may be of air cooling type, water cooling type, Peltier type, or other types. By cooling the light blocking plate 13 to release the heat of the laser beam applied to the light blocking plate 13, heating of the light blocking plate 13 is avoided.

Second Embodiment

Figure 3:
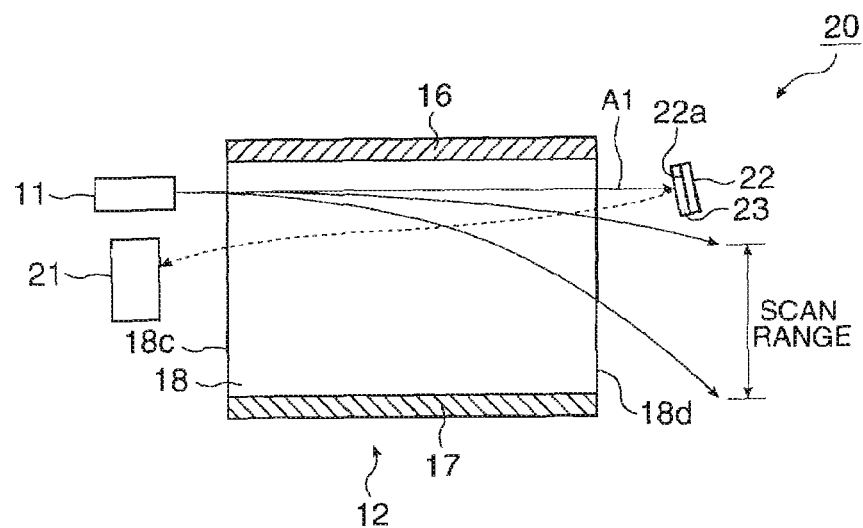
FIG. 3 is a plan view of a scan-type optical apparatus in a second embodiment according to the invention.

A second embodiment according to the invention is now described with reference to FIG. 3. In the following embodiments, similar reference numbers are given to the components and parts similar to those of the scan-type optical apparatus 1 in the first embodiment, and the same explanation of those is not repeated.

A scan-type optical apparatus 20 in this embodiment is different from the scan-type optical apparatus 1 in the first embodiment in that a light absorbing unit for absorbing laser beams at the stop of the electro-optic element is added.

A light blocking plate 22 has a reflection area 23 on a surface 22a opposed to the electro-optic element 12. The reflection area 23 is formed by a metal film having high reflectance. The reflection area 23 may be formed by a dielectric multilayer film.

The light blocking plate (light blocking member) 22 is disposed in such a position that the incident angle of the laser beam entering the reflection area 23 forms an angle with respect to the normal line. That is, according to this arrangement, the optical path A1 of the laser beam emitted from the light source device 11 when no voltage is applied to the optical element 18 is inclined with respect to the center axis of the light blocking plate 22. In this case, the laser beam emitted from the exit end surface 18d of the electro-optic element 12 is reflected by the reflection area 23 of the light blocking plate 22 toward the second electrode 17. Then, the reflected laser beam passes the interior of the optical element 18, and is released through the entrance end surface 18c. Thus, the beam reflected by the reflection area 23 of the light blocking plate 22 does not return to the laser beam source 11.

A light absorbing unit 21 is provided on the entrance end surface 18c side of the electro-optic element 12, and is disposed on the optical path of the laser beam reflected by the reflection area 23 and emitted from the entrance end surface 18c of the optical element 18. The light absorbing unit 21 is so designed as to have sufficient heat capacity, and is not broken even when continuously receiving laser beams.

The scan-type optical apparatus 20 in this embodiment offers similar advantages as those of the scan-type optical apparatus 1 in the first embodiment. The scan-type optical apparatus 20 is particularly effective when the output of the laser beam is so intensive that the heat of the laser beam applied to the light blocking plate 22 needs to be released. According to the first embodiment, the laser beam scan is conducted on the exit end surface 18d side of the electro-optic element 12, and it is difficult to securely produce a wide space sufficient for cooling the light blocking plate 22. Thus, the light absorbing unit 21 is disposed on the entrance end surface 18c side of the electro-optic element 12 where a wide space can be securely obtained. By providing the light absorbing unit 21 on the entrance end surface 18c side of the electro-optic element 12, the heat of the laser beam can be efficiently released.

It is possible to equip a fin for releasing the heat of the laser beam absorbed by the light absorbing unit 21 or a cooling unit for cooling the light absorbing unit 21 on the scan-type optical apparatus 20 in this embodiment. Since there is a sufficient space on the entrance end surface 18c side of the electro-optic element 12, the cooling unit for cooling the light absorbing unit 21 can be easily disposed. Thus, by effectively utilizing this space, the size reduction of the apparatus can be achieved.

Third Embodiment

Figure 4:
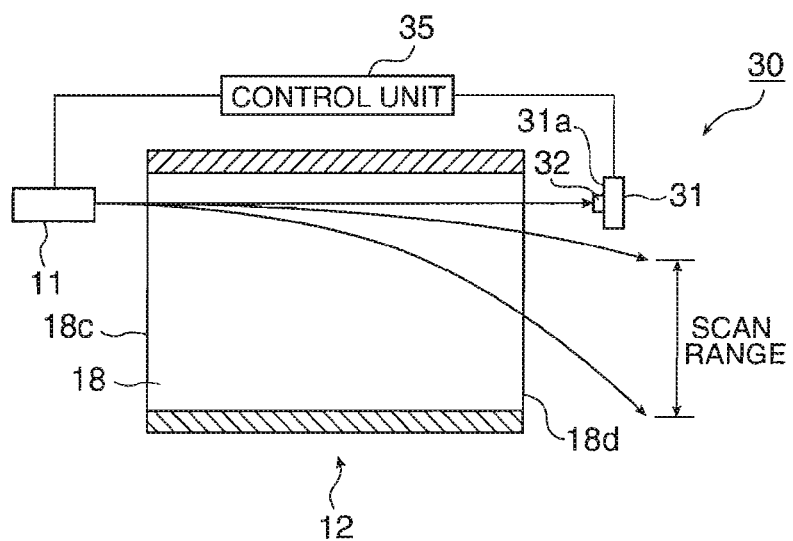
FIG. 4 is a plan view of a scan-type optical apparatus in a third embodiment according to the invention.

A third embodiment according to the invention is now described with reference to FIG. 4.

A scan-type optical apparatus 30 in this embodiment is different from the scan-type optical apparatus 1 in the first embodiment in that a mechanism for stopping emission of the laser beam when the electro-optic element stops is added.

A light blocking plate 31 has a photo diode (light detecting unit) 32 for executing photoelectric transfer on a surface 31a opposed to the electro-optic element 12.

The light source device 11 and the photo diode 32 are connected with a control unit 35. The control unit 35 controls the light source device 11 in accordance with the light detected by the photo diode 32. When the electro-optic element 12 fails for some reason, the laser beam emitted from the light source device 11 continuously irradiates the photo diode 32. Thus, the integral of energy detected by the photo diode 32 increases to a higher value than that when the electro-optic element 12 operates in the normal condition. Thus, the control unit 35 stops the operation of the light source device 11 when the photo diode 32 detects light intensity larger than a threshold as light intensity of the laser beam detected by the photo diode 32 when the electro-optic element 12 operates in the normal condition. The control unit 35 actuates the light source device 11 while the photo diode 32 is detecting light intensity smaller than the threshold.

The scan-type optical apparatus 30 in this embodiment offers similar advantages as those of the scan-type optical apparatus 1 in the first embodiment. In addition, according to the scan-type optical apparatus 30 in this embodiment, the control unit 35 turns off the Light source device 11 when the laser beam scan stops so as to prevent continuous irradiation of the laser beam onto the light blocking plate 31. Thus, breakage of the light blocking plate 31 and the wasted power consumption of the laser beam source 11 can be reduced. Moreover, since the laser beam is not continuously applied to the light blocking plate 31, the heat of the laser beam is not accumulated thereon. Accordingly, the necessity for cooling the light blocking plate 31 is eliminated, and thus the structural simplification and size reduction of the scan-type optical apparatus 30 can be achieved.

It is possible to provide the photo diode of this embodiment on the light blocking plate 22 of the second embodiment. This structure further prevents breakage of the light blocking plate 22 at the time of stop of the laser beam scan for some reason.

Fourth Embodiment

A fourth embodiment according to the invention is now described with reference to FIG. 5.

While the scan-type optical apparatus using the monochromatic light source device has been discussed in the first embodiment, a scan-type optical apparatus 50 in this embodiment protects an image on a screen using three color light source devices.

Figure 5:
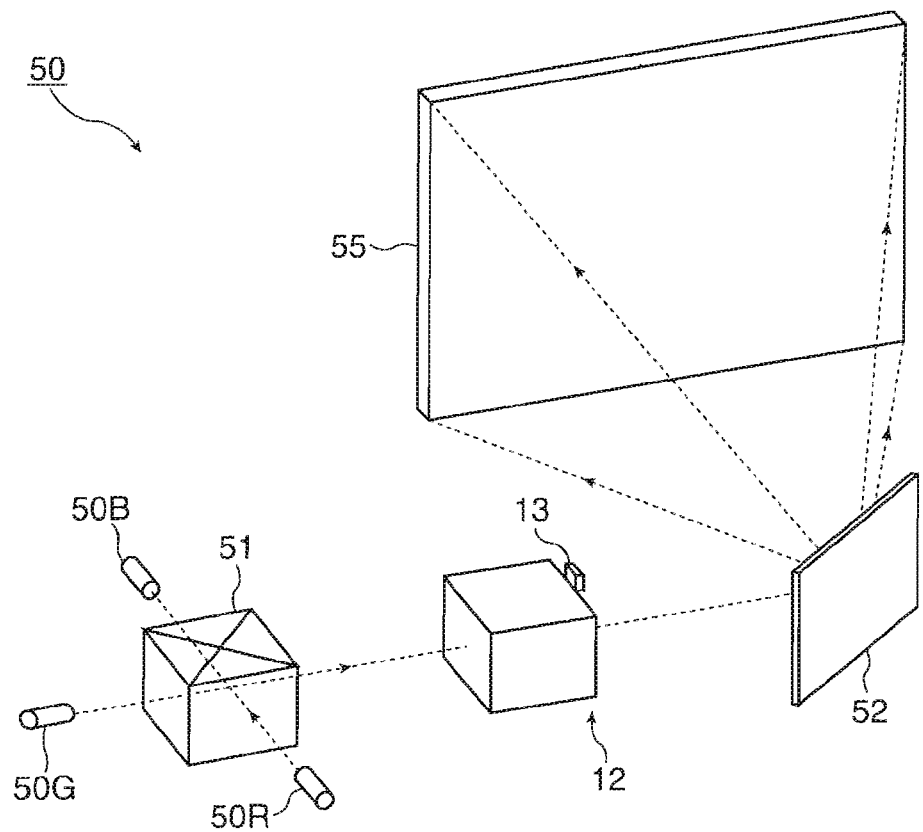
FIG. 5 is a perspective view of a scan-type optical apparatus in a fourth embodiment according to the invention.

As illustrated in FIG. 5, the image display apparatus 50 in this embodiment includes a red color light source device (light source device) 50R for emitting red color laser beams, a green color light source device (light source device) 50G for emitting green color laser beams, a blue color light source device (light source device) 50B for emitting blue color laser beams, a cross dichroic prism 51, the electro-optic element 12 for conducting scan of laser beams emitted from the cross dichroic prism 51 on a screen 55 in the horizontal direction, and a galvano-mirror 52 for conducting scan of laser beams emitted from the electro-optic element 12 on the screen 55 in the vertical direction.

The method of protecting an image on the screen 55 using the image display apparatus 50 having this structure according to this embodiment is now discussed.

The laser beams emitted from the respective light source devices 5R, 50G and 50B are synthesized by the cross dichroic prism 51, and the laser beam after synthesis enters the electro-optic element 12. The electro-optic element 12 and the galvano-mirror 52 conduct scan of the laser beam having entered the electro-optic element 12 on the screen 55 in the horizontal direction and in the vertical direction, respectively, so that an image can be projected on the screen 55.

According to the image display apparatus 50 in this embodiment, the laser beam is blocked by the light blocking plate 13 when the laser beam scan stops. Thus, the laser beam does not continuously irradiate a certain area (one point) of the screen 55.

It is possible to use an inexpensive polygon mirror for scanning in lieu of the galvano-mirror 52. Since the electro-optic element 12 included in the image display apparatus executes highly accurate scanning, even such an image display apparatus which uses a mirror having lower accuracy than that of the galvano-mirror can achieve high-performance image display at reduced cost.

The technical scope of the invention is not limited to the embodiments described and depicted herein, but various modifications and changes may be given thereto without departing from the scope and spirit of the invention.

The scan-type optical apparatuses according to the first through third embodiments are applicable to a laser printer.

In the above embodiments, the light blocking plate is disposed out of the scan range of the laser beam. It is possible, however, to locate the light blocking plate at such a position that the light blocking plate includes an end of the laser beam which lies within the scan range but does not contribute to the image display, that is, at such a position that the laser beam out of the image display range can be applied to the light blocking plate when the laser beam scan is conducted for an area exceeding the image display range. In other words, it is possible to dispose the light blocking plate at a position not included in the range contributing to the image display by the laser beam scan.

In this embodiment, the electro-optic element is constituted by the KTN crystal. However, other elements whose refractive index linearly varies may be used instead of the KTN crystal. For example, the electro-optic element may be a dielectric crystal having electro-optic effect such as $LiNbO_3$ (lithium niobate). However, since the crystal having a composition such as $LiNbO_3$ has a smaller scanning deflection angle than that of the KTN crystal and requires high driving voltage, it is more preferable to use the KTN crystal.

The entire disclosure of Japanese Patent Application No. 2006-224108, filed Aug. 21, 2006 is expressly incorporated by reference herein.

What is claimed is:

1. A scan-type optical apparatus, comprising:
   a light source device that emits a laser beam;
   an electro-optic element that conducts scan of the laser beam emitted from the light source device by varying refractive index distribution in accordance with the level of voltage to be applied; and
   a light blocking member disposed on an optical path of the laser beam emitted from the electro-optic element when no voltage is applied to the electro-optic element.

2. The scan-type optical apparatus according to claim 1, wherein the light blocking member is disposed on or in the vicinity of a border of a scan range of the laser beam emitted from the electro-optic element when voltage is applied to the electro-optic element to generate an electric field in the electro-optic element.

3. The scan-type optical apparatus according to claim 1, wherein the light blocking member is disposed at a position out of the scan range of the laser beam.

4. The scan-type optical apparatus according to claim 3, wherein the light blocking member is disposed out of a range of the laser beam scan contributing to image display.

5. The scan-type optical apparatus according to claim 1, further including a cooling unit that cools the light blocking member.

6. The scan-type optical apparatus according to claim 1, wherein:
   the light blocking member has a reflection area that reflects the laser beam emitted from the electro-optic element toward an entrance end surface of the electro-optic element; and
   a light absorbing unit that absorbs the laser beam reflected by the reflection area is provided on the entrance end surface side of the electro-optic element.

7. The scan-type optical apparatus according to claim 6, further including a cooling unit that cools the light absorbing unit.

8. The scan-type optical apparatus according to claim 1, wherein:
   the light blocking member has a light detecting unit that detects a laser beam; and
   a control unit that controls operation of the light source device in accordance with detection of the laser beam by the light detecting unit is included.

9. The scan-type optical apparatus according to claim 1, wherein the electro-optic element has a composition of $KTa_{1-x}Nb_xO_3$.

* * * * *